United States Patent [19]

Nakajima

[11] 4,438,507

[45] Mar. 20, 1984

[54] INPUT SIGNAL CONTROL DEVICE

[75] Inventor: Yoshinori Nakajima, Kanagawa, Japan

[73] Assignee: Ricoh Co., Ltd., Tokyo, Japan

[21] Appl. No.: 300,804

[22] Filed: Sep. 10, 1981

Related U.S. Application Data

[63] Continuation-in-part of Ser. No. 233,947, Feb. 12, 1981, abandoned, which is a continuation of Ser. No. 51,986, Jun. 25, 1979, abandoned.

[51] Int. Cl.³ ............................................. G06F 3/12
[52] U.S. Cl. ...................................... 364/900; 400/76
[58] Field of Search ................. 364/200, 900; 400/17, 400/61–69, 76; 178/23 R

[56] References Cited

U.S. PATENT DOCUMENTS

| | | | |
|---|---|---|---|
| 3,581,285 | 5/1971 | Neema et al. | 364/900 |
| 3,651,487 | 3/1972 | Washington | 364/200 |
| 3,938,641 | 2/1976 | Fulton | 364/900 |
| 4,138,719 | 2/1979 | Swanstrom et al. | 364/200 |

Primary Examiner—Thomas M. Heckler
Attorney, Agent, or Firm—Burgess, Ryan and Wayne

[57] ABSTRACT

An input signal control device for a printer in which a strobe pulse of one category and its associated input data are stored in a storage location identified by the same address; the succeeding strobe pulses and their associated data are sequentially stored in succeeding addresses in the order of their arrival; and the stored strobe pulses and their associated data are read out in the order of their arrival; that is, in a first-in first-out manner.

8 Claims, 8 Drawing Figures

INPUT SIGNAL CONTROL DEVICE

RELATED APPLICATIONS

This application is a continuation-in-part of copending application Ser. No. 233,947 filed Feb. 12, 1981 abandoned; which copending application is a continuation of earlier copending application Ser. No. 51,986 filed June 25, 1979 abandoned.

BACKGROUND OF THE INVENTION

The present invention relates to generally an input signal control device and more particularly an interface circuit for feeding control data into a serial-printer control system.

In general, the printer control circuit processes the received control data so as to generate various signals for actuating various mechanisms in a serial printer. Data processors have been widely used for processing control data. Control data include character data for actuating a print wheel and printing desired characters, carriage data for controlling the shift of a carriage, paper-feed data for rotating a platen through a predetermined angle, and so on. These control data arrive at the printer control circuit together with a strobe pulse which identifies or specifies the information that the associated data conveys. Therefore, the strobe pulses are a character strobe pulse, a carriage strobe pulse, a paper-feed strobe pulse, and so on. The strobe pulses and their associated data arrive at a high data-flow rate of the order of nanoseconds, but the data processor incorporated in the printer control circuit can only execute the received data at a rate of microseconds. It follows, therefore, that if the control data were fed at a high rate into the printer control circuit which can operate only at an extremely slow rate as compared with a high rate of data flow, the printer control circuit could not process the received data correctly. Therefore, there must be provided an interface or a buffer for storing temporarily the incoming control data so as to compensate for the difference between a high rate of the incoming data flow and a slow rate of data flow through the printer control circuit.

In response to the control data arriving continuously, the printer control circuit changes its control sequence. Therefore, the input data items must be processed in the order they have arrived. That is, the input data items must propagate through the interface in a first-in-first-out manner so that the correct control by the printer control circuit can be ensured.

There have been devised and demonstrated various systems for satisfying such requirements as described above. For instance, U.S. Pat. No. 4,035,781 discloses a system comprising a data register for storing therein input data, a priority logic circuit for sensing the order of arrival of the data items at the data register, and an output bus assembler for controlling the delivery of data items from the data register in response to the output from the priority logic circuit, whereby data items are fed into a printer control circuit in a first-in-first-out manner. A tag attached to a data item is encoded into an address signal which specifies a storage location in the data register at which is stored the data item. The storage locations are fixed previously depending upon the categories of the input data items. Therefore, the priority logic circuit must be provided so as to sense and store the order of arrival of input data items in the data register. The output bus assembler must be provided so that in response to the output from the priority logic circuit, the stored data items are read out in a first-in-first-out manner.

SUMMARY OF THE INVENTION

One of the objects of the present invention is, therefore, to provide an input signal control device which can eliminate the priority logic circuit and the output bus assembler of the types described above.

Another object of the present invention is to provide an input signal control device in which a strobe pulse of one category and its associated input data are stored in a storage location identified by the same address; the succeeding strobe pulses and their associated data are sequentially stored in succeeding addresses in the order of their arrival; and the stored strobe pulses and their associated data are read out in the order of their arrival; that is, in a first-in-first-out manner.

To the above and other ends, the present invention provides an input signal control device comprising a common data line for receiving various data; a plurality of strobe lines for receiving strobe pulses each specifying the information which its associated data conveys; a storage means adapted to store therein a strobe pulse and its associated data which are received simultaneously through one of said strobe lines and said common data line; a first control means adapted to sense the arrival of a strobe pulse and generate a write-timing pulse in response to which the received strobe pulse and its associated data are stored in the storage means and an input-address changing pulse; an input-address control means responsive to the input-address changing pulse from the first control means for specifying an address in the storage means at which are stored a strobe pulse and its associated data; and an output-address control means adapted to specify an address in said storage means from which the received and stored strobe pulse and its associated data are read out in a first-in-first-out manner.

DESCRIPTION OF THE PREFERRED EMBODIMENT

In general, the serial printer comprises a platen against which is pressed a sheet of recording paper, a mechanism for rotating the platen, a print mechanism for producing the images of desired characters on the paper, and a mechanism for displacing the print mechanism in the horizontal direction. The print mechanism includes a mechanism for selecting the characters in response to input data and a print head.

In addition to data, an interface circuit of the serial printer of the type described above receives a paper-feed strobe pulse for rotating the platen, a carriage strobe pulse for displacing the print mechanism in the horizontal direction and a character strobe pulse for selecting desired characters and producing the images thereof. These three kinds of strobe pulses will not be simultaneously applied to the interface circuit.

Figure 1:
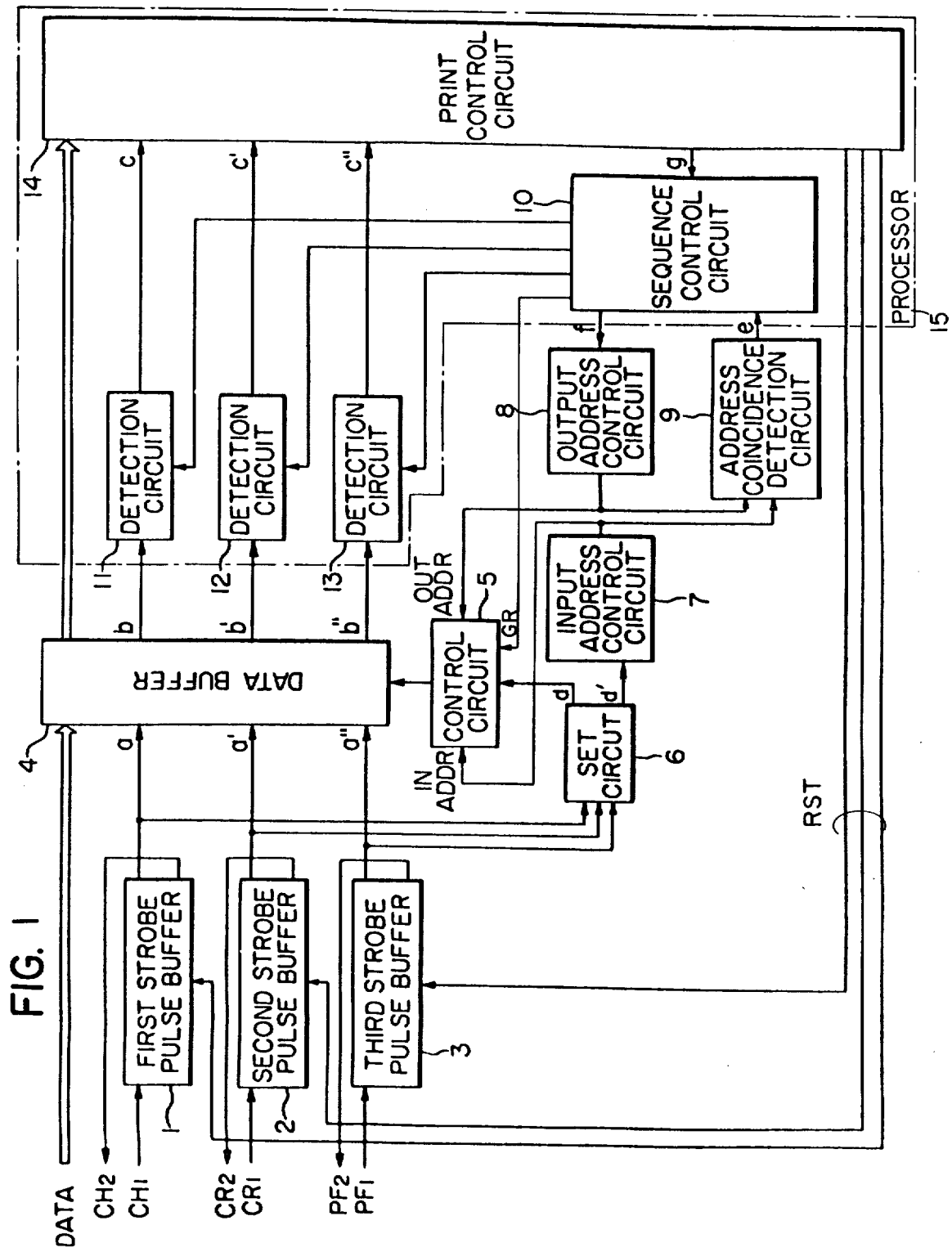
FIG. 1 is a block diagram of a first embodiment of the present invention.

An interface circuit in accordance with the present invention as shown in FIG. 1, has a line for receiving the character strobe pulse CH1, a line for receiving the carriage strobe pulse CR1, a line for receiving the paper-feed strobe pulse PF1, a line CH2 on which is transmitted a character-ready signal indicating whether or not the character strobe pulse can be received, a line CR2 on which is transmitted a carriage-ready signal indicating whether or not the carriage strobe pulse can be received, a line PF2 on which is transmitted a paper-feed-ready signal indicating whether or not the paper-feed strobe pulse can be received and a data line for receiving data in response to one of three strobe pulses.

Figure 2:
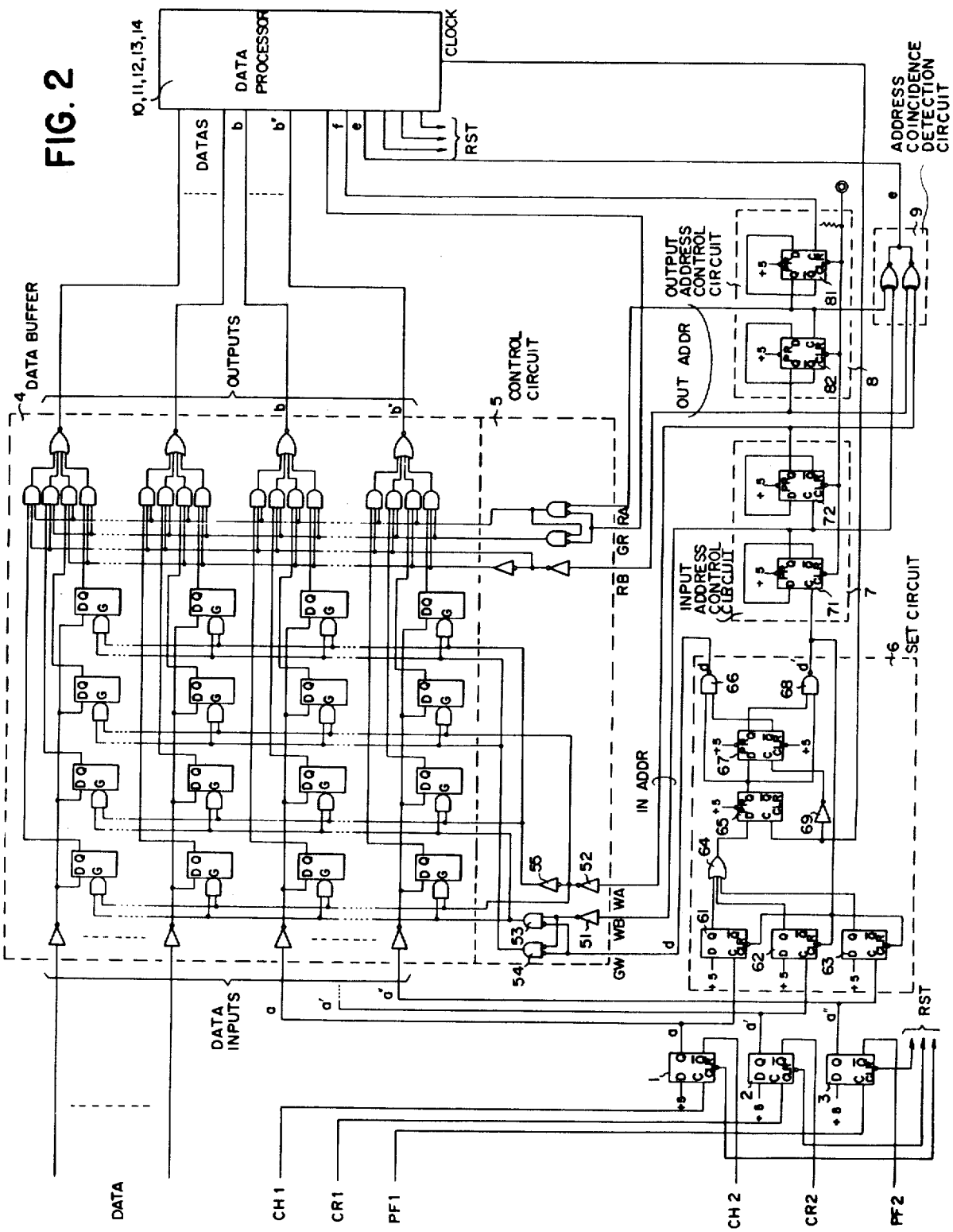
FIG. 2 is a detailed circuit diagram thereof.

The character, carriage and paper-feed strobe pulses enter first, second and third strobe pulse buffers 1, 2 and 3, respectively, each of which may comprise a conventional flip-flop (See FIG. 2). The received data are stored in a data buffer 4 which is controlled by a control circuit 5. The data buffer 4 and the control circuit 5 may be an IC of registers. For instance, a plurality of 4-by-4 registers (SN74LS170), the products of Texas Instrument Inc., are connected in parallel, the number of the registers being depending upon the number of bits in data. In FIG. 2, the data buffer 4 and the control circuit 5 are shown as comprising a single IC of registers with each word having a predetermined number of bits.

A set circuit 6 senses which one of the strobe pulse buffers 1 to 3 has received the strobe pulse and generates a set signal which sets a timing for writing data into the data buffer 4 and a signal for changing an address for the next writing. As shown in FIG. 2, the set circuit 6 comprises latching circuits or flip-flops 61, 62 and 63 for holding the strobe pulses, a flip-flop 65 and a NAND gate 66 which coact to generate a set signal which sets a timing for writing data in the data buffer 4 in synchronism with a clock when one of the three strobe pulses is latched by its corresponding flip-flop 61, 62 or 63 and a flip-flop 67 and a NAND gate 68 which coact to generate a signal in response to which an input-address control circuit 7 changes the input address.

The input-address control circuit 7 generates the input-address signal IN ADDR that is, the signal specifying positions in the data buffer 4 at which are stored one of the three strobe pulses and its corresponding data in the order received. As shown in FIG. 2, the input-address control circuit 7 comprises flip-flops 71 and 72 which constitute a counter. The contents in the control circuit 7 may be decremented or counted down or incremented by one every time when it receives the output signal from the set circuit 6. Thus, the contents in the counter is applied as IN ADDR to the data-buffer control circuit 5.

An output-address control circuit 8 generates a signal OUT ADDR which in turn is applied to the control circuit 5. In response to the signal OUT ADDR, the strobe pulse and its corresponding data stored in the data buffer 4 are read out in a first-in-first-out manner and transferred into a printer control circuit 14. As shown in FIG. 2, the output-address control circuit 8 comprises flip-flops 81 and 82 which constitute a counter. The contents of the counter are incremented or decremented by one in response to the output signal from a sequence control circuit 10 to be described below.

The control circuit 5 decodes the address signal IN ADDR from the input-address control circuit 7 and selects the addressed storage positions in the data buffer 4. In response to the set signal from the set circuit 6, the control circuit 5 controls the timing for writing data into the buffer 4. In response to the output signal OUT ADDR from the output-address control circuit 8, the control circuit 5 controls the reading of data from the addressed positions in the buffer 4.

An address-coincidence detection circuit 9 compares the input address IN ADDR with the output address OUT ADDR and generates a coincidence or noncoincidence signal on a line e. The noncoincidence signal indicates that data to be transferred into the printer control circuit 14 are still stored in the data buffer 4. The address-coincidence detection circuit 9 is of the conventional type comprising two EXCLUSIVE-NOR gates 91 and 92 as shown in FIG. 2.

In response to the output signal transmitted on a line g from the printer control circuit which represents that the printer control circuit 14 is ready to receive the next data, the sequence control circuit 10 applies the output signal through a line f to the output-address control circuit 8 so that the contents in the control circuit 8 are incremented or decremented by one. In response to the noncoincidence output signal from the address-coincidence detection circuit 9, the sequence control circuit 10 applies a timing signal to a detection circuit 11.

The detection circuit 11 senses the change in stage of the signals on output lines b, b' and b" from the data buffer 4 and transmits through a line c, c' or c" the signal representative of the received strobe pulse to the printer control circuit 14.

The sequence control circuit 10, the detection circuits 11, 12 and 13 and the printer control circuit 14 may be implemented individually, but in practice it is preferable that they be in the form of an integrated circuit IC or a data processor as indicated by 15 in FIGS. 1 and 2.

Figure 3:
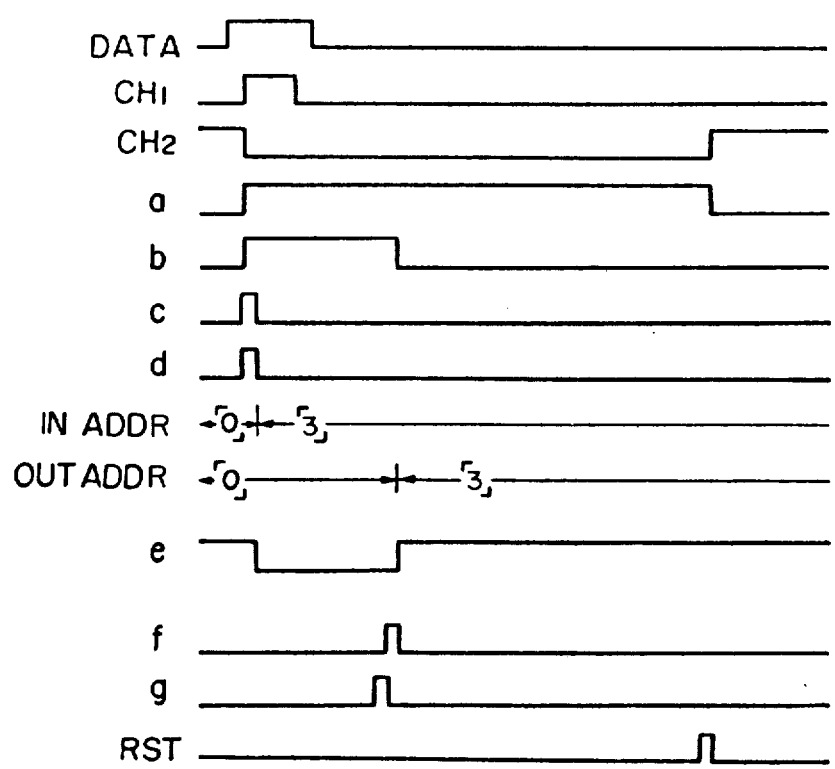
FIG. 3 shows a timing chart used to explain the mode of operation thereof when only one strobe pulse and its associated data are received.
Figure 4:
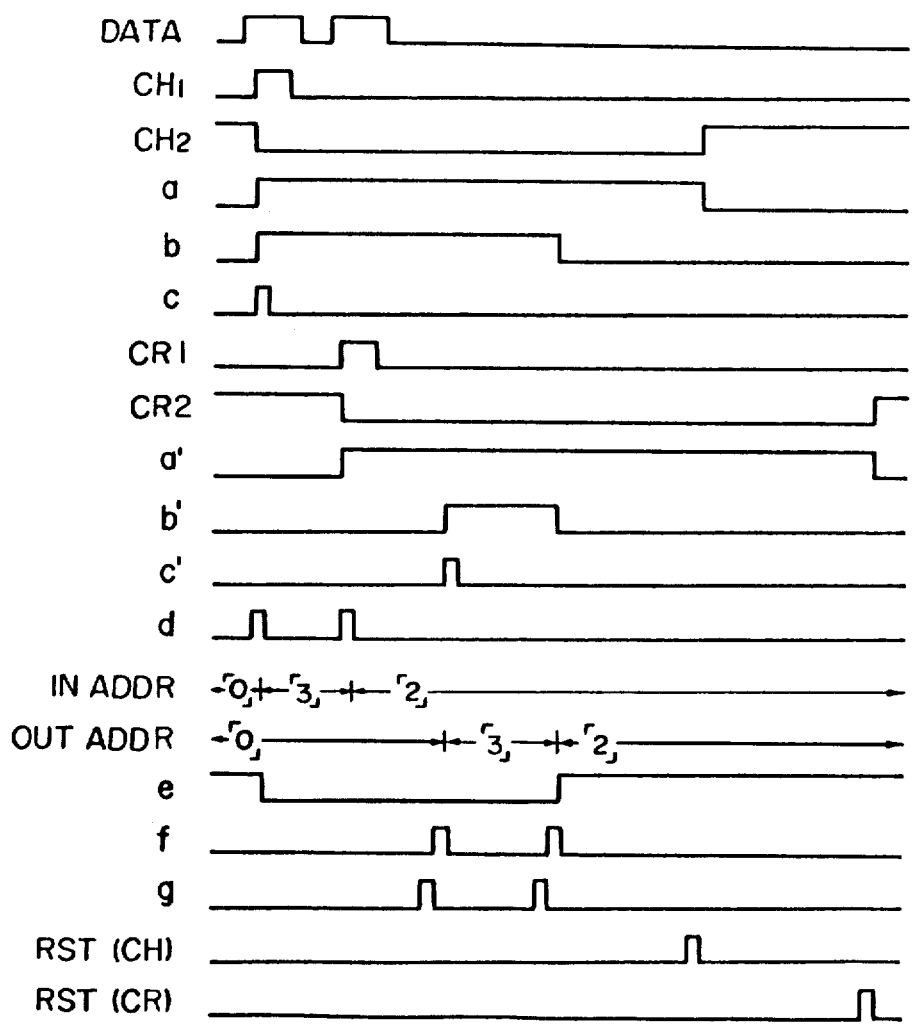
FIG. 4 shows a timing chart used to explain the mode of operation thereof when two strobe pulse and their associated data received successively.

FIG. 3 is a timing chart when the input signal control device as shown in FIGS. 1 and 2 has received only strobe pulse CH1 and FIG. 4 is a timing chart when it has received two strobe pulses CH1 and CR1 successively. The symbols shown in FIGS. 3 and 4 correspond to those, respectively, shown in FIGS. 1 and 2.

Figure 5:
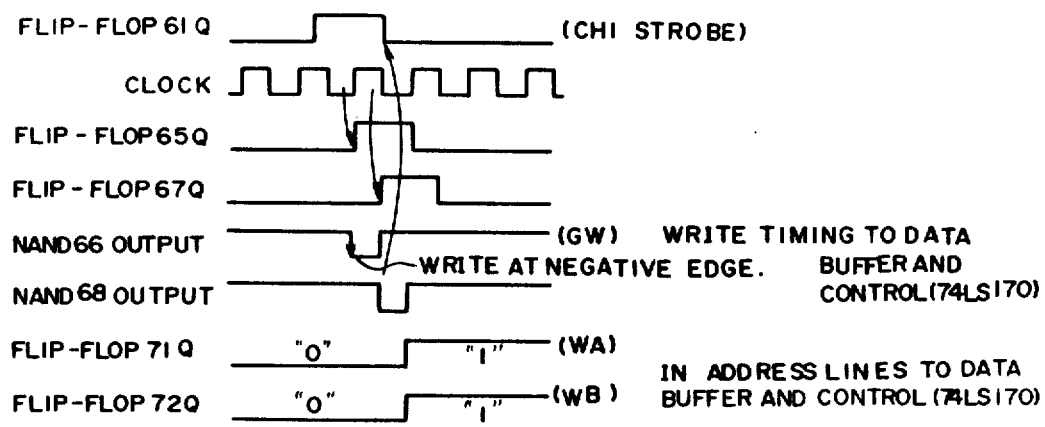
FIG. 5 shows a timing chart used to explain the mode of operation of a set circuit thereof.

Referring FIGS. 1, 2 and 3, the mode of operation will be described when one strobe pulse CH1 is received. It is assumed that the first, second and third strobe pulse buffers 1, 2 and 3 be initially reset. When data are received, the strobe pulse that is, the character strobe pulse CH1 identifying the received data is also received simultaneously. The strobe pulse CH1 is stored in the first strobe pulse buffer 1 and the line a rises to a high level and concurrently the signal CH2 is returned so as to prohibit the transmission of the next strobe pulse CH1. In response to the high-level output signal on the line a, the set circuit 6 is actuated to generate the set signal on the line d. That is, the high-level output signal on the line a is latched by the flip-flop 61 and its Q output is transmitted through an OR gate 64 to the D input of the flip-flop 65. The clock signal is applied to the C input of the flip-flop 65. As shown in FIG. 5, in response to the rise of the first clock pulse after the strobe pulse CH1 has been latched by the flip-flop 61, the Q output of the flip-flop 65 goes HIGH. At this instant, the $\overline{Q}$ output of the flip-flop 67 is high so that the output of the NAND gate 66 changes from high to low. In response to this negative edge, data are written into the data buffer 4. The clock pulse is applied through an inverter 69 to the C input of the flip-flop 67, its Q output goes high in response to the fall of the first clock pulse and consequently the output of the NAND gate 66 goes high again. Concurrently, the output of the NAND gate 68 goes low and in response to its negative edge the flip-flop 61 is reset.

The control circuit 5 decodes the address signal IN ADDR from the input-address control circuit 7 as described previously. In response to the output signal transmitted on the line d ±rom the set circuit 6, the control circuit 5 selects the specified addresses in the data buffer so that the strobe pulse CH1 and its associated data can be stored in the data buffer 4. The input-address control circuit 7 is a two-bit binary counter so that the addresses of four word positions Word 0 to Word 3 in the data buffer can be specified. When the data buffer 4 has no information, the contents in the two-bit binary counter 7 is zero and is decremented to "3", "2" and "1" every time when it receives the output from the NAND gate 68. In response to the strobe pulse CH1, the set signal appears at the output or the line d of the NAND gate 66 and at this instant the contents in the counter or the input-address control circuit 7 is "0". That is, both the flip-flops 71 and 72 are in the logical "0" state. As a result, the control circuit 5 specifies the address "0" that is, the word position "0" in the data buffer 4 so that the character strobe CH1 and its associated data are stored in the address "0". In response to the trailing edge of the negative output pulse from the NAND gate 68, the input-address control circuit 7 is decremented by 1 to 3 as shown in FIG. 5. That is, both the flip-flops 71 and 72 are switched to the logical "1" state.

The output-address control circuit 8 selects or specifies the address in the buffer 4 from which the data are read out as described previously. It is substantially similar in construction to the input-address control circuit 7. In response to the output signal transmitted along the line f from the sequence control circuit 10, the contents in the output-address control circuit 8 are decremented by one. That is, the contents are changed in the order of "0 ", "3", "2" and "1". As shown in FIG. 3, the contents in the output-address control circuit 8 are "0" immediately after the strobe pulse CH1 and its associated data have been written into the address "0" in the data buffer 4. The coincidence detection circuit 9 generates the noncoincidence output because, as described above, the contents in the input-address control circuit 7 are "3" while the contents in the output-address control circuit 8 are "0". The noncoincidence signal is transmitted to the sequence control circuit 10 through the line e, indicating that the data to be read out are still stored in the data buffer 4. Then, the sequence control circuit 10 applies the read-out signal to the terminal GR (See FIG. 2) of the control circuit 5 and consequently the strobe pulse CH1 and its associated data stored in the address "0" in the data buffer 4 appear on its output line. (FIG. 2 shows the timing chart when the read-out signal is normally applied to the terminal GR of the control circuit 5.) When the strobe pulse CH1 is read out, the output line b goes high from low and the detection circuit 11 senses the change in state of the output line b that is, the positive-going edge. In response to the timing signal applied from the sequence control circuit 10, the detection circuit 11 generates the signal representing that the data now being read out into the printer control circuit 14 are associated with the character strobe pulse CH1 that is, the character data. This signal is transmitted through the output line c to the printer control circuit 14. Now, the sequence control circuit 10 is ready to receive the next data-request signal transmitted through the line g from the printer control circuit 14. After having received the signal transmitted on the output line c and initiated the required processing, the printer control circuit 14 generates the next data-request signal on the line g.

In response to the data-request signal, the sequence control circuit 10 transmits the output signal through the line f to the output-address control circuit 8 so that the contents of the latter are decremented by one. That is, the next address of the storage location in the data buffer 4 from which the data are read out is specified. Thus, the contents in the output-address control circuit 8 become "3" which is equal to the contents in the input-address control circuit 7. As a result, the address-coincidence detection circuit 9 generates the coincidence output signal on the line e. Thus, the input signal control device is ready to receive the next strobe pulse and its associated data.

After having terminating the processing required by the strobe pulse CH1 or after having received the whole data associated therewith, the printer control circuit 14 generates the reset signal which in turn is applied to the character strobe pulse buffer 1 so as to reset it. When the buffer 1 is reset, it generates the strobe-pulse-demand signal CH2.

Figure 6:
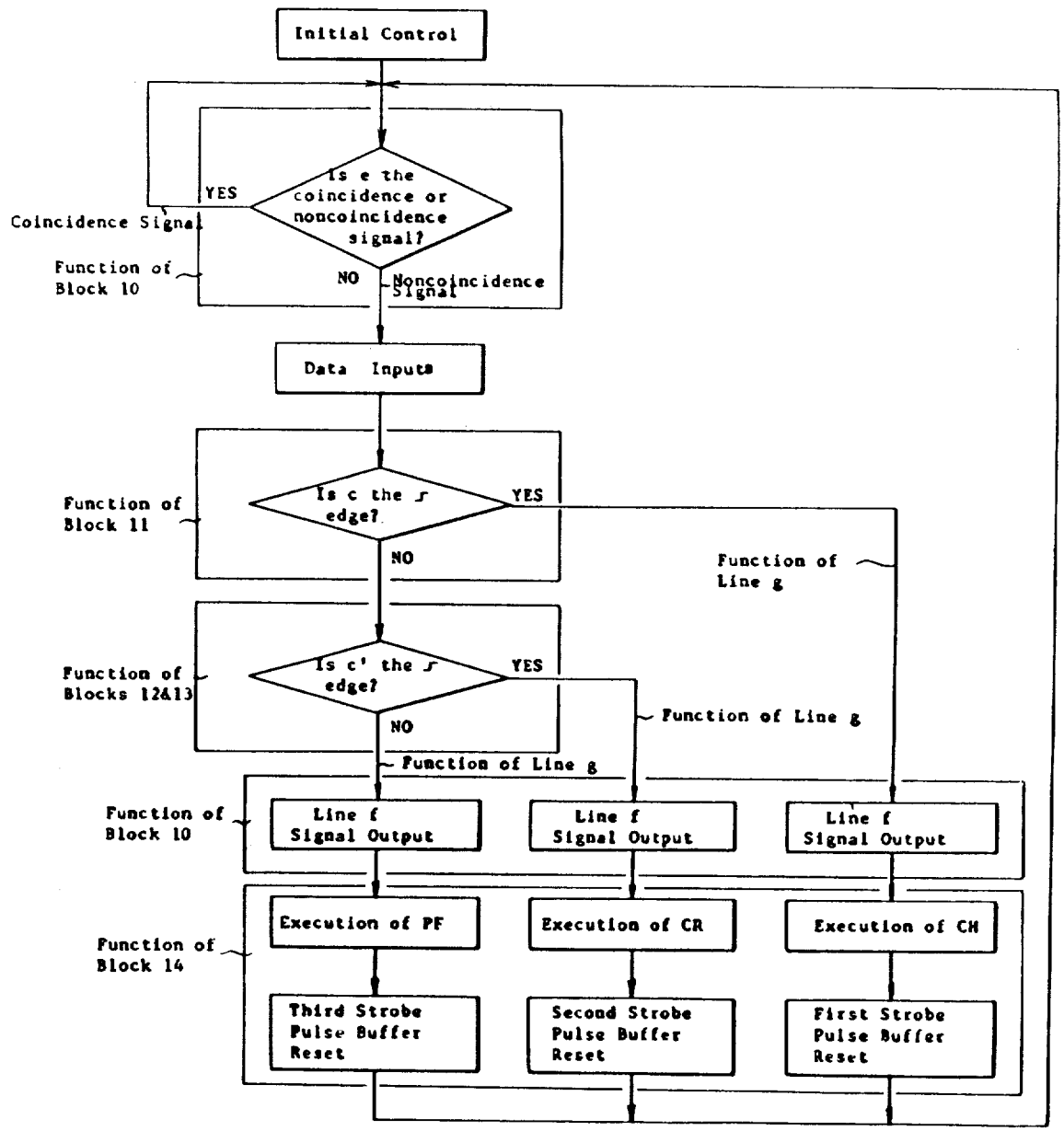
FIG. 6 shows a flowchart of program or routine to be executed by a sequence control circuit, detection circuits 11, 12 and 13 and a printer control circuit 14 shown in FIG. 1 which are implemented in the form of a programmed data processor.

As described previously, the sequence control circuit 10, the detection circuits 11, 12 and 13 and the printer control circuit 14 may be implemented in the form of one-chip processor 15 with required memories. FIG. 6 shows the flowchart of a program of routine accomplished by the processor 15 that is, the functions to be accomplished by these circuits 10 to 14.

Referring next to FIGS. 2 and 4, the mode of operation will be described when two strobe pulses CH1 and CR1 are received successively. The data line is common among the data associated with the strobe pulses CH1, CR1 and PF1 so that when two strobe pulses CH1 and CR1 are received, their associated data are received successively.

The operation, when the character strobe pulse CH1 has received, has been already described with particular reference to FIG. 3. Therefore, it is assumed that after the character strobe pulse CH1 has been received, it and its associated data be stored in the address "0" in the data buffer 4, the contents in the input-address control circuit 7 be "3" and the contents in the output-address control circuit 8 be "0". It is further assumed that prior to the appearance of the next data-request signal on the output line g of the printer control circuit 14, the next strobe pulse CR1 be received. The strobe pulse CR1 is stored in the second strobe pulse buffer 2 and consequently the signal appears on its output line a' so that the set circuit 6 is actuated. The output signal is transmitted on the line d to the control circuit 5 and another output signal is transmitted on the line d' to the input-address control circuit 7 so as to decrement its contents by one. When the set signal d rises, the contents of the input-address control circuit 7 are "3" as described previously so that the carriage strobe pulse CR1 and its associated data are stored in the address "3" in the data buffer 4. In response to the fall of the signal d, the contents in the input-address control circuit 7 are decremented by one to "2".

When the sequence control circuit 10 receives the data-request signal g from the printer control circuit 14, it transmits the output signal on the line f to the output-address control circuit 8 so that the contents thereof are decremented by one to "3" from "0". Then, the contents that is, the strobe signal CR1 and its associated data, stored in the address "3" in the data buffer 4 appear on its output lines. Since the carriage strobe pulse CR1 is stored in the address "3" in the data buffer 4, the signal on the output line b' goes from low to high when the storage location "3" is addressed. This is detected by the detection circuit 12 so that the signal on the output line c' changes its stage, indicating the arrival of the carriage strobe pulse CR1 to the printer control circuit 14.

Then, the data associated with the carriage strobe pulse CR1 and stored in the storage location "3" in the data buffer 4 are transferred into the printer control circuit 14. After having received all the data, it generates again the data-request signal g which in turn is applied to the sequence control circuit 10. Then, the sequence control circuit 10 applies the output signal f to the output-address control circuit 8 so that the contents thereof are decremented by one from "3" to "2". Now, the contents in the input-address control circuit 7 are in coincidence with those of the output-address control circuit 8 so that the coincidence detection circuit 9 generates the coincidence output signal e which is applied to the sequence control circuit 10. The coincidence output signal e means that there exist no strobe pulse and its associated data stored in the data buffer that is, the strobe pulse and its associated pulse stored in the data buffer have been completely transferred into the printer control circuit 14.

After the termination of the printer control in response to the carriage strobe pulse CR1, the printer control circuit 14 transmits the reset signal to the second strobe pulse buffer 2 to reset it.

Figure 7:
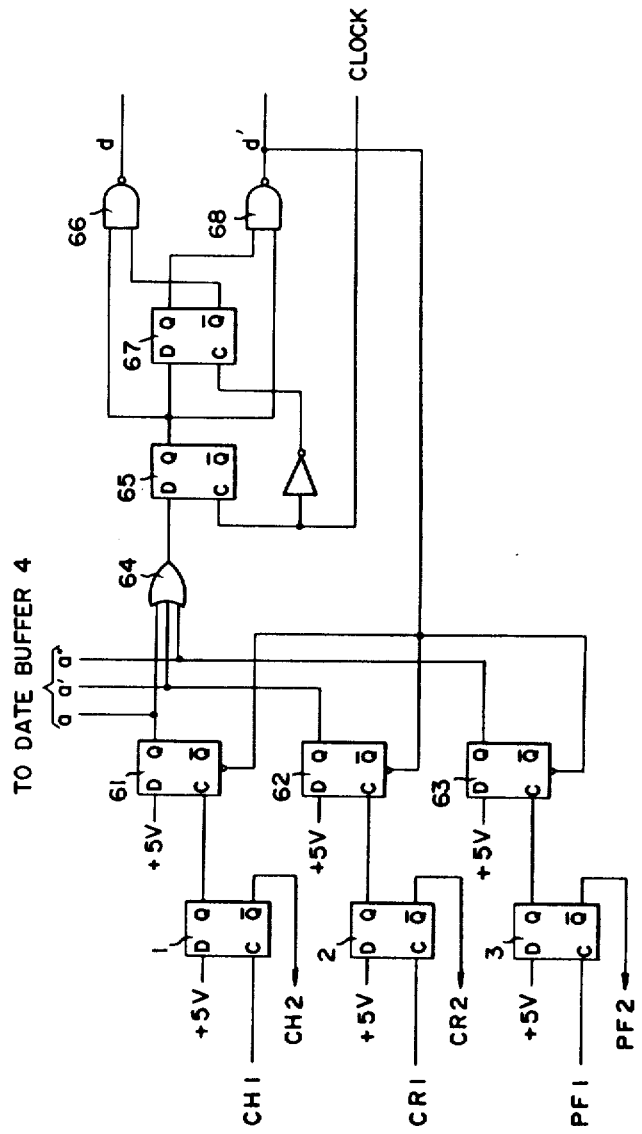
FIG. 7 is a circuit diagram of a second embodiment of the present invention.
Figure 8:
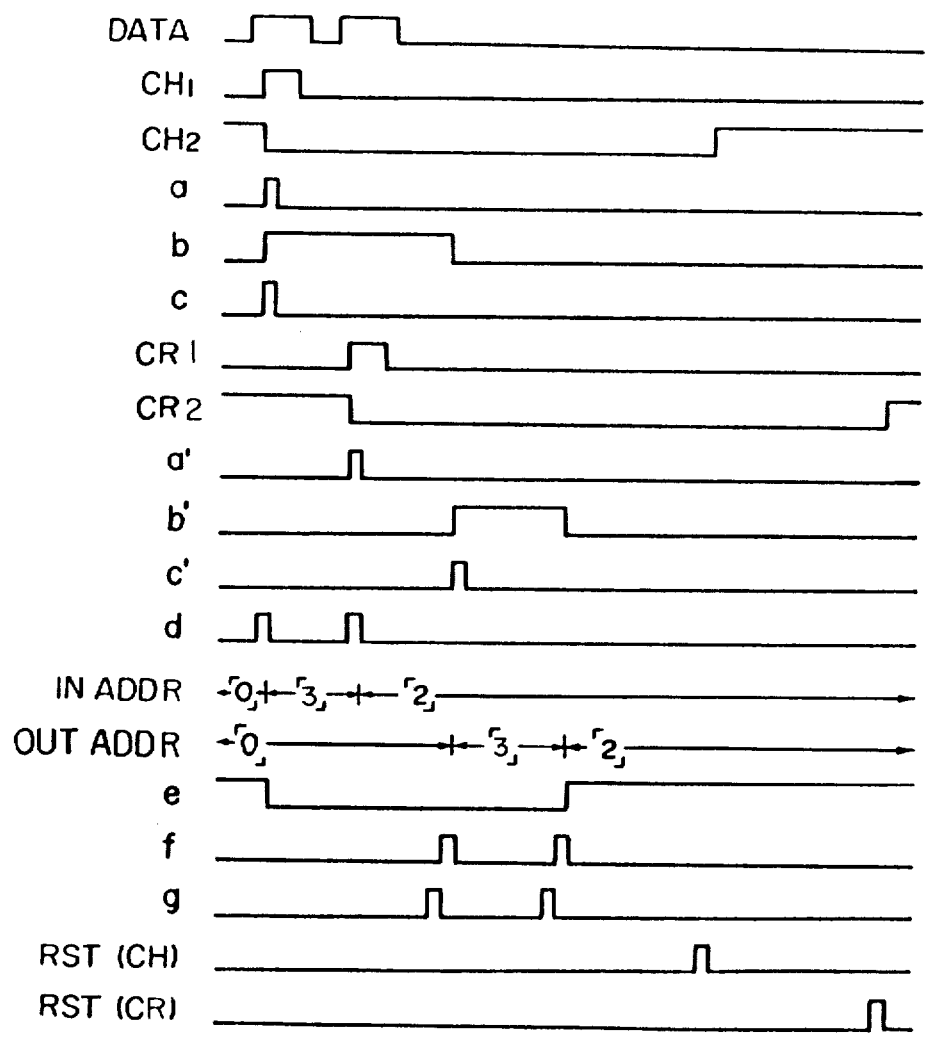
FIG. 8 is a timing chart to explain the mode of operation thereof when two strobe pulses and their associated data are received successively.

In FIG. 7 is shown a second embodiment of the present invention which is substantially similar in construction to the first embodiment shown in FIG. 2 except that instead of directly apply the outputs from the first, second and third strobe pulse buffers 1, 2 and 3 to the data buffer 4, the Q outputs of the flip-flops 61, 62 and 63 are applied to the data buffer 4. Therefore, the pulses a and a' are decreased in pulse width as shown in FIG. 8.

What is claimed is:

1. An interface device of the type for sequentially applying to a printer information for controlling said printer, said information being transmitted on common data buses and strobe lines from a source device whose data processing speed is faster than that of said printer, said information for controlling said printer consisting of digital data signals transmitted on said common data buses and strobe pulses for identifying the operations to be performed by said printer transmitted on said strobe lines, said interface device comprising:
(a) a storage means in which each address location has a storage location for storing a digital signal therein which is connectable to said common data buses, and a storage location for storing a strobe pulse which is connectable to said strobe lines;
(b) a first control means which is connected to at least one of said strobe lines and which is responsive to a strobe pulse on said at least one strobe line so as to generate a write-timing pulse in response to which said information for controlling said printer is stored and an input-address changing pulse;
(c) an input-address control means for specifying an input address of said storage means into which said information for controlling said printer is to be stored, and for changing an input address specified in response to said input-address changing pulse; and
(d) an output-address control means for specifying an output address of said storage means from which said information for controlling said printer may be sequentially read out in the order said printer information is stored in said storage means.

2. An interface device as set forth in claim 1, further comprising control signal generating means which, in response to an input strobe pulse, generates a control signal for inhibiting the application of the succeeding information for controlling said printer with a strobe pulse which is equal to the strobe pulse of the applied information, until the applied information for controlling said printer has been processed; and a signal line for transmitting the thus generated control signal to said source device.

3. An interface device as set forth in claim 2, wherein said control signal generating means comprises a flip-flop.

4. An interface device as set forth in claim 1, wherein each of said input-address control means and said output-address control means comprises a counter.

5. An interface device as set forth in claim 1, wherein said first control means comprises
(a) a plurality of first flip-flops for receiving each of said strobe pulses,
(b) a second flip-flop whose inputs are connected to the outputs of said first flip-flops and a clock pulse generator for sensing the received strobe pulse latched or held in one of said first flip-flops in response to a clock pulse received,
(c) a third flip-flop which is set one half cycle of the clock pulse after said second flip-flop has been set, each of said flip-flops having a Q output and a $\bar{Q}$ output,
(d) a first NAND gate whose inputs are connected to the Q output of said second flip-flop and the Q output of said third flip-flop, respectively, for generating said write-timing signal, and
(e) a second NAND gate whose inputs are connected to the Q outputs of said second and third flip-flops for generating said input-address changing pulse.

6. An interface device as set forth in claim 1, further characterized by the provision of
an address-coincidence detection means for comparing the outputs from said input-address and output-address control means (7, 8) for generating a coincidence or noncoincidence output signal, and
a sequence control means (10) not only responsive to the noncoincidence output from said address-coincidence detection means (9) for generating a read control signal (GR) which in turn is applied to said storage means but also responsive to a data-request signal for generating the output signal to be applied to said output-address control means so as to actuate the same.

7. An interface device as set forth in claim 6, wherein detection means (11, 12, 13) discriminates kinds of operation controls of the information for controlling said printer which is stored in said storage means by detecting the rise of an output pulse on a sense line connected to the storage location of said storage means for storing a strobe pulse and by detecting on which sense line said rise of said output pulse occurred in response to a timing signal from the sequence control means.

8. An interface device as set forth in claim 7, wherein said sequence control means (10) and said strobe pulse sensing or detecting means (11, 12, 13) are implemented in the form of programmed means in a data processor to execute data received from said interface device.

* * * * *